US011140886B1

(12) United States Patent
Shore et al.

(10) Patent No.: US 11,140,886 B1
(45) Date of Patent: Oct. 12, 2021

(54) LIVEWELL (71) Applicants: Alec B. Shore, Pocahontas, AR (US); Coty Junkerseld, Pocahontas, AR (US)

(72) Inventors: Alec B. Shore, Pocahontas, AR (US); Coty Junkerseld, Pocahontas, AR (US)

( * ) Notice: Subject to any disclaimer, the term of this patent is extended or adjusted under 35 U.S.C. 154(b) by 99 days.

(21) Appl. No.: 16/655,737

(22) Filed: Oct. 17, 2019

(51) Int. Cl.
A01K 97/20 (2006.01)
A01K 61/65 (2017.01)
A01K 97/05 (2006.01)

(52) U.S. Cl.
CPC .............. A01K 97/20 (2013.01); A01K 61/65 (2017.01); A01K 97/05 (2013.01)

(58) Field of Classification Search
CPC ........ A01K 97/20; A01K 97/05; A01K 97/04; A01K 61/60; A01K 61/65; A01K 61/53; A01K 61/55
See application file for complete search history.

(56) References Cited

U.S. PATENT DOCUMENTS

| 1,725,864 | A |   | 8/1929 | James |  |
|---|---|---|---|---|---|
| 2,253,688 | A |   | 8/1941 | Collins |  |
| 2,603,028 | A |   | 7/1952 | Roberts |  |
| 2,722,770 | A |   | 11/1955 | Giordano |  |
| 4,003,338 | A | * | 1/1977 | Neff | A01K 61/60 119/223 |
| 4,498,190 | A |   | 2/1985 | Garlick, III |  |
| 4,697,380 | A | * | 10/1987 | Fenske | A01K 97/04 220/263 |
| 4,724,631 | A | * | 2/1988 | Wang | A01K 97/20 43/55 |
| 4,845,886 | A | * | 7/1989 | Robinson | A01K 97/20 43/55 |
| 5,299,530 | A | * | 4/1994 | Mukadam | A01K 61/60 119/223 |
| 5,636,469 | A | * | 6/1997 | Pizzolo | A01K 97/04 206/315.11 |
| 6,662,488 | B1 |   | 12/2003 | Heimbrock et al. |  |
| 6,990,765 | B1 |   | 1/2006 | Beech |  |
| 7,219,465 | B2 |   | 5/2007 | Beech |  |
| 7,377,071 | B1 | * | 5/2008 | Thompson | A01K 97/05 43/56 |
| 8,393,110 | B2 |   | 3/2013 | Ball |  |
| 10,021,867 | B2 |   | 7/2018 | Tipton |  |
| 2002/0020104 | A1 | * | 2/2002 | Kolar | A01K 97/05 43/55 |
| 2002/0083638 | A1 | * | 7/2002 | Cunningham, Sr. | A01K 97/20 43/54.1 |
| 2004/0231226 | A1 | * | 11/2004 | Yust | A01K 63/02 43/55 |

(Continued)

FOREIGN PATENT DOCUMENTS

GB  2552363 A * 1/2018 ............. A01K 97/05

Primary Examiner — Timothy D Collins
Assistant Examiner — Madeline L Douglas
(74) Attorney, Agent, or Firm — Cramer Patent & Design; Aaron R. Cramer (57) ABSTRACT A portable livewell comprises a buoyant top frame, hinged lid, hinged trapdoor, and a removable mesh net capable of nesting within the buoyant top frame. The livewell further comprises a length of cordage secured at a first end to the livewell and a second end to a ground stake. A pair of handles are secured on opposite ends of the buoyant top frame.

15 Claims, 5 Drawing Sheets (56) References Cited

U.S. PATENT DOCUMENTS

| | | | |
|---|---|---|---|
| 2005/0086851 A1* | 4/2005 | Carden, Jr. | A01K 97/05 43/55 |
| 2007/0251137 A1* | 11/2007 | Boos, Jr. | A01K 97/20 43/55 |
| 2011/0277692 A1* | 11/2011 | Lindgren | B29D 28/00 119/215 |
| 2012/0159835 A1* | 6/2012 | Saltsman | A01K 97/05 43/54.1 |
| 2020/0120914 A1* | 4/2020 | Gniffke | A01K 97/05 |

* cited by examiner

LIVEWELL

RELATED APPLICATIONS

Not applicable.

FIELD OF THE INVENTION

The present invention relates generally to livewells.

BACKGROUND OF THE INVENTION

Many fishermen use a live well to retain caught fish while fishing. Whether they are used as part of a catch and release fishing expedition or simply to keep the fish alive till cleaning at the end of the day, live wells are as important to many fishermen as the fishing rod itself. However, many of these live wells use complicated aeration systems, water pumps, and even temperature control systems to keep the water inside as close as possible to the body of water from which the fish was caught.

Unfortunately, as is the case with many mechanical systems, they are prone to failure at the most inopportune times, they are somewhat costly to purchase and operate, and require a source of power which may or may not be available. Accordingly, there exists a need for a means by which fishing live wells can be provided with the means to operate without power and in a foolproof manner to address the concerns as outlined above. The development of the portable livewell provides this solution.

SUMMARY OF THE INVENTION

The principles of the present invention provide for a passive livewell, comprises a generally rectangular-shaped open mesh basket having four open mesh sides as well as an open mesh bottom. Two of the four open mesh sides are short sides each having a basket carrying handle to facilitate carrying the passive livewell. A passive livewell also comprises a flotation lid provided with a sealed collar which may be filled. The center of the flotation lid is provided with a lid to provide access to the interior of the open mesh basket. The passive livewell also comprises a tether attachment point which is provided on a face of the open mesh basket, adjacent a top, for use with a tether. The tether is used with an anchor stake to tether the passive livewell to grade near a user.

The passive livewell also comprises one or more first hinges connecting the sealed collar and the flotation lid, a lift handle for lifting of the flotation lid, a trapdoor disposed on a center of the flotation lid, and a second hinge hingedly attaching the trapdoor to the flotation lid in a flush manner such that the upper surfaces thereof are coextensive. The second hinge is a torsion spring that biases the trapdoor upwards and closed against the flotation lid. The passive livewell also comprises a downward force applied to the upper surface of the trapdoor that press against the second hinge and provide access to the interior of the open mesh basket, a solid exterior box slipped over the basket may also be provided for transport of the passive livewell and a notch formed on an upper perimeter edge to align with the tether attachment point of the basket to permit passage thereof.

Two exterior box carrying handles may be provided in the solid exterior box which align with the two basket carrying handles of the basket when the basket is entirely placed within the solid exterior box. The open mesh basket may be made of ultraviolet resistant plastic from an injection molding process. The open mesh basket may also be made of ultraviolet resistant plastic from a blow molding process.

The open mesh basket may be twenty-four inches wide, eighteen inches tall, and sixteen inches deep. A plurality of mesh openings may be disposed on the four open mesh sides and the bottom are one square inch in diameter. The basket and the flotation lid may be formed as a unitary component. The basket and the flotation lid may be formed separately and attached to each other by a mechanical fastening means. The mechanical fastening means is an adhesive. The collar may be filled with material selected from the group consisting of air, Styrofoam, or closed cell foam.

The tether is connected to the tether attachment point at a first end and to the anchor stake at an opposing second end. The tether may be made of waterproof material which may be nylon or polypropylene. The tether may also be twenty five feet long.

The solid exterior box may be left empty to capture dripping water from the open mesh field during subsequent transport and storage. The passive livewell may be filled with water, with the basket inside, to carry caught fish from the catch location to another location for further processing. The basket is configured to float at the waterline with the basket submerged in the body of water. As fish are caught, they may be placed within the basket either through the trapdoor or the lid such that they remain alive throughout an entire fishing outing. The buoyant nature of the flotation lid may ensure that the basket remains under water and any caught fish remain in the same water from which they were just caught to allow them to remain alive for long periods of time and ensures fresher tasting fish when processed at the end of a fishing event.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY 10 passive livewell
15 basket
20 flotation lid
25 open mesh field
30 basket carrying handle
35 tether attachment point
40 tether
45 anchor stake 50 sealed collar
51 trapdoor
55 lid
60 first hinge
61 second hinge
65 lift handle
70 solid exterior box
71 notch
75 exterior box carrying handle
80 mesh opening
85 user
90 body of water
95 shoreline
100 waterline

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. DETAILED DESCRIPTION OF THE FIGURES

Figure 1:
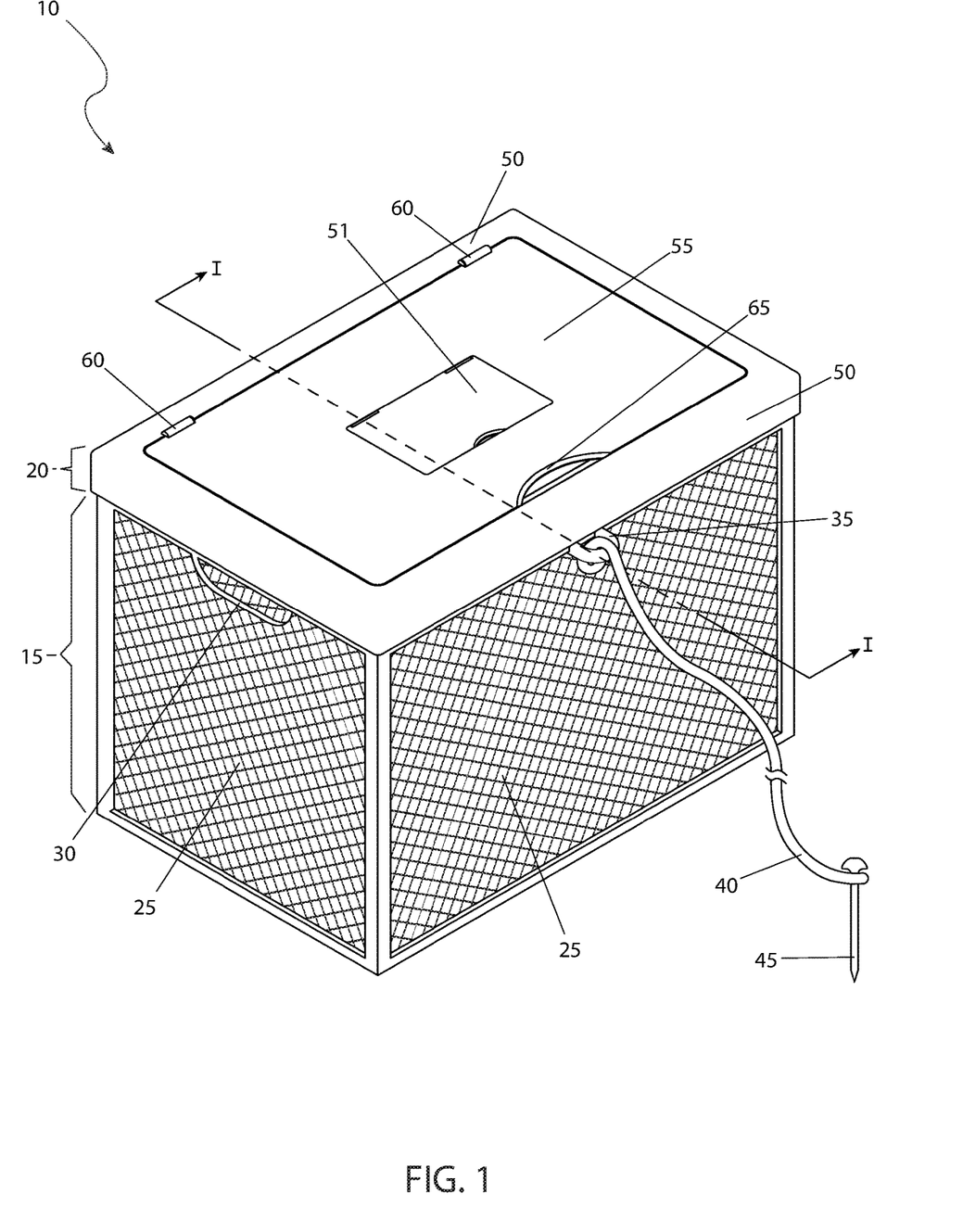
FIG. 1 is a pictorial view of the passive livewell 10, according to the preferred embodiment of the present invention.

Referring now to FIG. 1, a pictorial view of the passive livewell 10, according to the preferred embodiment of the present invention is disclosed. The passive livewell 10 (herein also described as the "device") 10, includes two (2) primary components: an open mesh basket 15 and a flotation lid 20. The basket 15 has the approximate dimensions of twenty-four inches (24 in.) wide, eighteen inches (18 in.) tall, and sixteen inches (16 in.) deep; however, other sizes may be produced depending on the needs of the user. As such, the overall dimension of the device 10 is not intended to be a limiting factor of the present invention. All four (4) sides as well the bottom (not visible in this figure due to illustrative limitations) is provided with an open mesh field 25. The two (2) short sides are provided with basket carrying handles 30 to facilitate carrying of the device 10 to and from homes, point of use, vehicles, and the like. A tether attachment point 35 is provided on the face of the basket 15, adjacent the top, for use with a tether 40. The tether 40 is used with an anchor stake 45 to tether the device 10 to grade near a user.

The flotation lid 20 is provided with a sealed collar 50 which may be filled with air or other material such as Styrofoam®, closed cell foam, or the like, which floats on water. The center of the flotation lid 20 is provided with a lid 55 to provide access to the interior of the device 10 (i.e., the interior of the basket 15). The lid 55 is connected by one (1) or more first hinges 60 (two (2) of which are shown here) between the sealed collar 50 and the lid 55. A lift handle 65 is present to allow for lifting of the lid 55. It is envisioned that the basket 15 and the flotation lid 20 would be made of ultraviolet (UV)-resistant plastic in an injection or blow molding process. The open mesh field 25 would be made as an integral component to the basket 15.

A trapdoor 51 is located on the lid 55, preferably in a center thereof. A second hinge 61 hingedly attaches the trapdoor 61 to the lid 55, preferably in a flush manner such that the upper surfaces thereof are coextensive. In a preferred embodiment, the second hinge 61 is a torsion spring that biases the trapdoor 61 upwards and closed against the lid 55. A downward force applied to the upper surface of the trapdoor 51 can press against the second hinge 61 and provide access to the interior of the device 10 (i.e., the interior of the basket 15).

Figure 2:
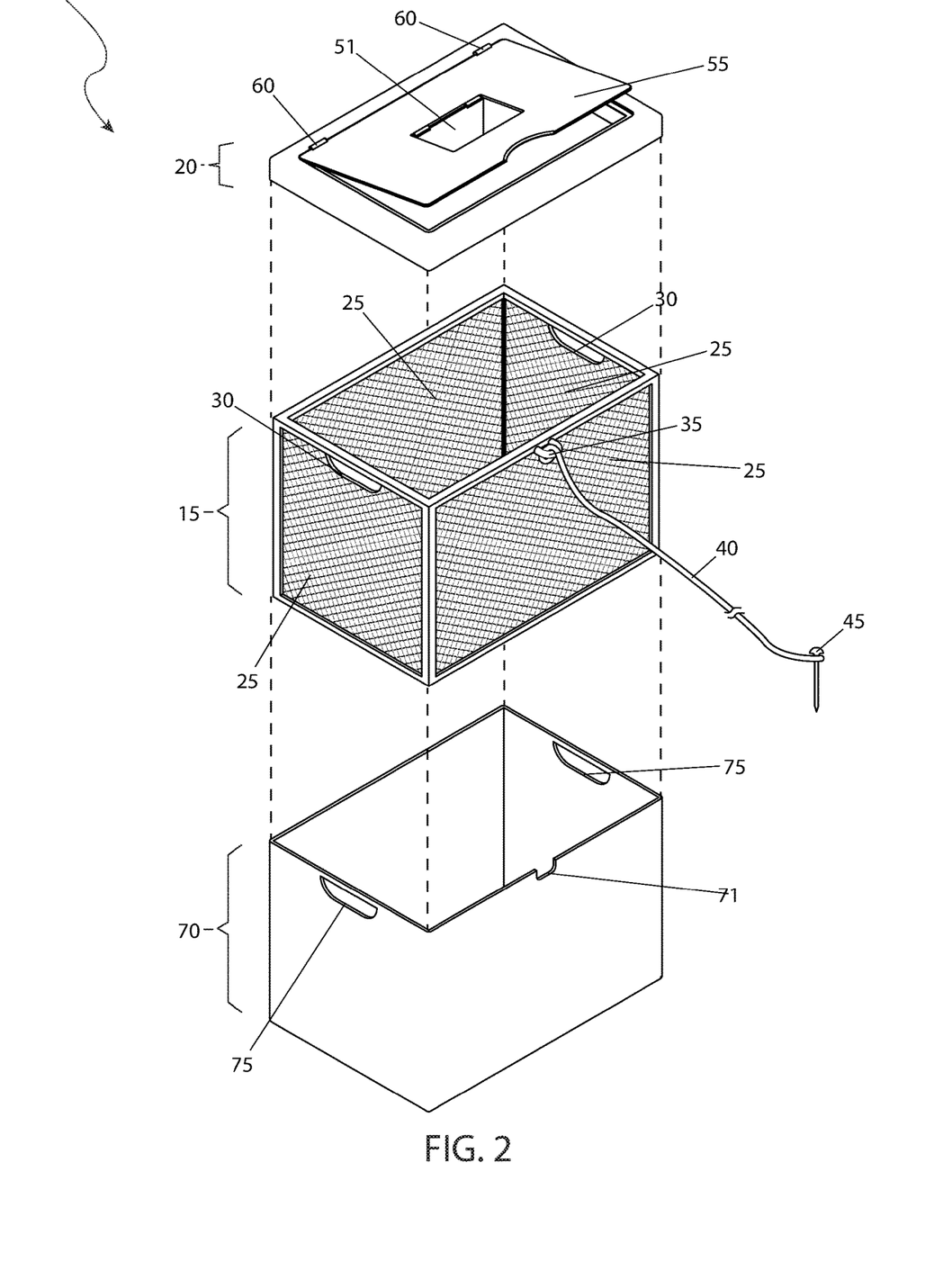
FIG. 2 is an exploded view of the passive livewell 10, according to the preferred embodiment of the present invention.

Referring next to FIG. 2, an exploded view of the device 10, according to the preferred embodiment of the present invention is depicted. This view depicts the basket 15 separated from the flotation lid 20. The basket 15 depicts the open mesh field 25 on all four (4) sides of the basket 15 as well as the bottom. The basket 15 and the flotation lid 20 may also be formed as a unitary component or formed separately and attached to each other by adhesive or similar mechanical fastening means. A solid exterior box 70 that slips over the basket 15 is provided for transport of the device 10. A notch 71 is formed on an upper perimeter edge, preferably in the middle, to align with the tether attachment point 35 of the basket 15 to permit the passage thereof.

The device 10 may be filled with water, with the basket 15 inside, to carry caught fish from the catch location to another location for further processing. Keeping the caught fish in water will help preserve the fish. It is also envisioned that the solid exterior box 70 may be left empty to capture dripping water from the open mesh field 25 during subsequent transport and storage. Two (2) exterior box carrying handles 75 are provided in the solid exterior box 70 which align with the two (2) basket carrying handles 30 of the basket 15 when the basket 15 is entirely placed within the solid exterior box 70. The lid 55 is shown in a partially open state as it is opened about the first hinges 60. It is envisioned that the solid exterior box 70 would be of a slightly larger dimension than that of the basket 15 and would be made of UV-resistant plastic in an injection or blow molding process. The tether 40 is connected to the tether attachment point 35 at a first end and to the anchor stake 45 at an opposing second end, is envisioned to be made of waterproof material such as nylon, polypropylene, or the like. The total length of the tether 40 is envisioned at approximately twenty-five feet (25 ft.).

Figure 3:
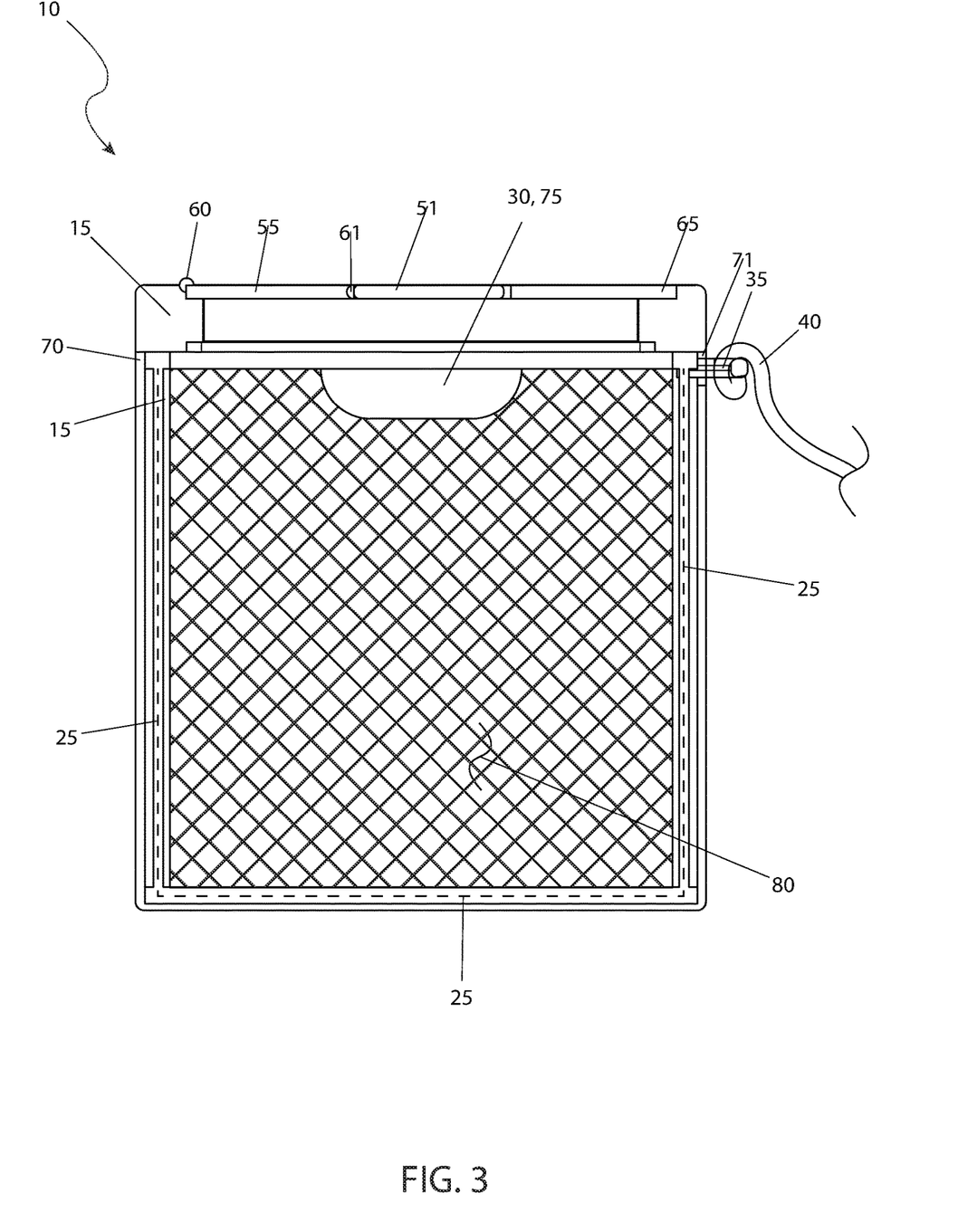
FIG. 3 is a sectional view of the passive livewell 10, as seen along a line I-I, as shown in FIG. 1, according to the preferred embodiment of the present invention.

Referring now to FIG. 3, a sectional view of the device 10, as seen along a line I-I, as shown in FIG. 1, according to the preferred embodiment of the present invention is shown. This view discloses the open mesh field 25 on three (3) of the four (4) sides as well as the bottom of the basket 15. The mesh openings 80 provided by the open mesh field 25 are envisioned to be approximately one square inch (1 in2.). However, other openings, both smaller and larger depending on the user's needs may be accommodated by the teachings of the present invention. As such, the size of the mesh openings 80 provided by the open mesh field 25 are not intended to be a limiting factor of the present invention. The solid exterior box 70 is visible on the exterior of the basket 15. The lid 55 is flush mounted with the exterior of the basket 15 and held in place with the hinges 60 and is accessed via the lift handle 65. The basket carrying handles 30 and the aligned exterior box carrying handles 75 are visible at the upper edge of the basket 15 on the short sides, while the tether attachment point 35 and the tether 40 are visible on the front.

Figure 4:
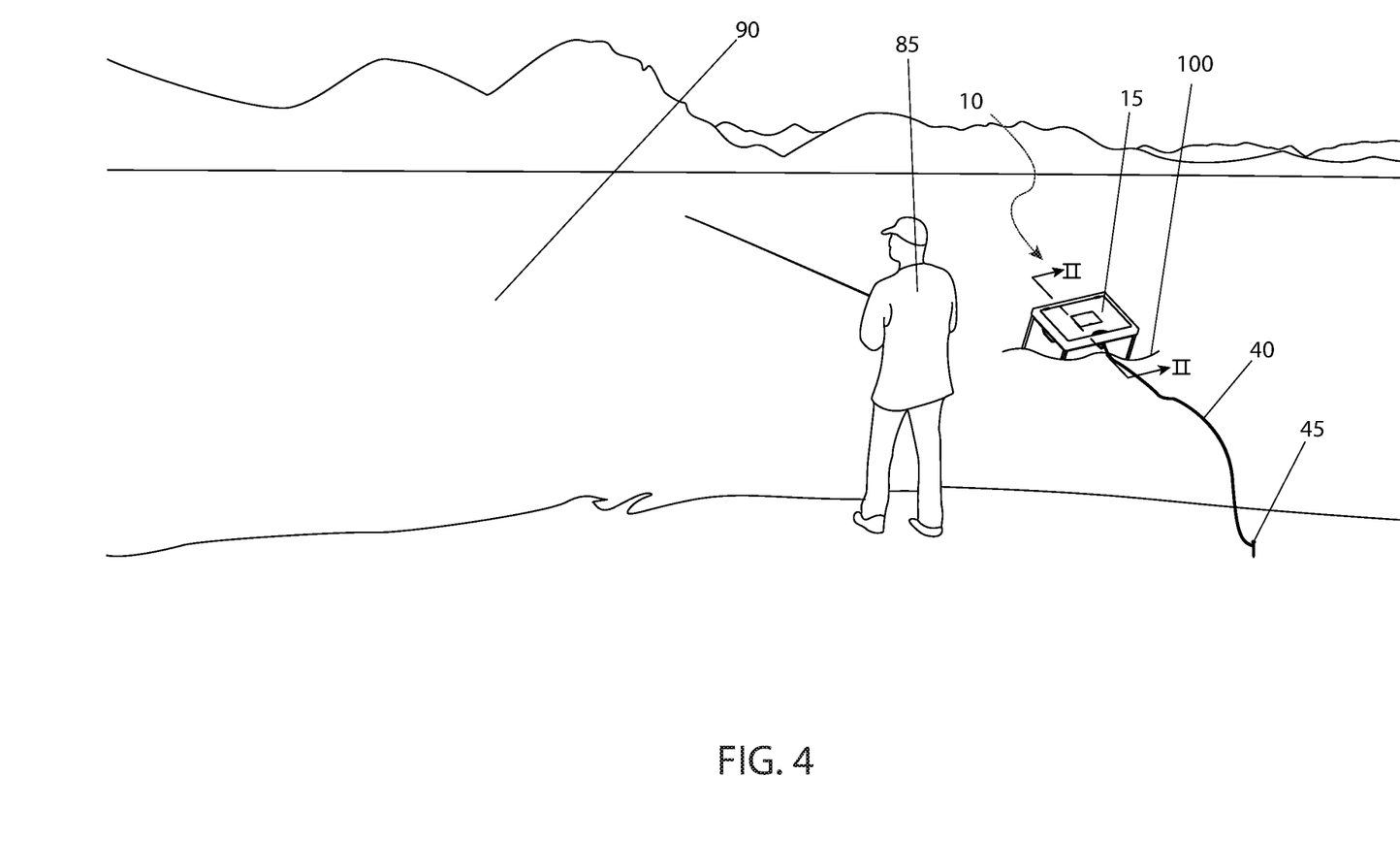
FIG. 4 is a perspective view of the passive livewell 10, shown in a utilized state, according to the preferred embodiment of the present invention; and, FIG. 5 is a sectional view of the passive livewell 10, as seen along a line II-II, as shown in FIG. 4, while being utilized, according to the preferred embodiment of the present invention.

Referring next to FIG. 4, a perspective view of the device 10, shown in a utilized state, according to the preferred embodiment of the present invention is disclosed. A user 85 is shown fishing in a body of water 90 such as a lake, river, stream, pond, or the like. The device 10 is tethered to shoreline 95 via the tether 40 and the anchor stake 45. The basket 15 is floating at the waterline 100 with the basket 15 (not shown due to illustrative limitations) submerged in the body of water 90. As fish are caught, they are placed within the basket 15 either through the trapdoor 51 or the lid 55 such that may remain alive throughout the entire fishing outing. While FIG. 4 depicts usage along a shoreline, other instances of use could occur should one be fishing from a dock or even a boat. In such instances, usage remains similar with the exception that the tether 40 would be attached to a stationary object such as dock post, handrail, cleat, or other fixed object using a knot or loop in the tether 40.

Figure 5:
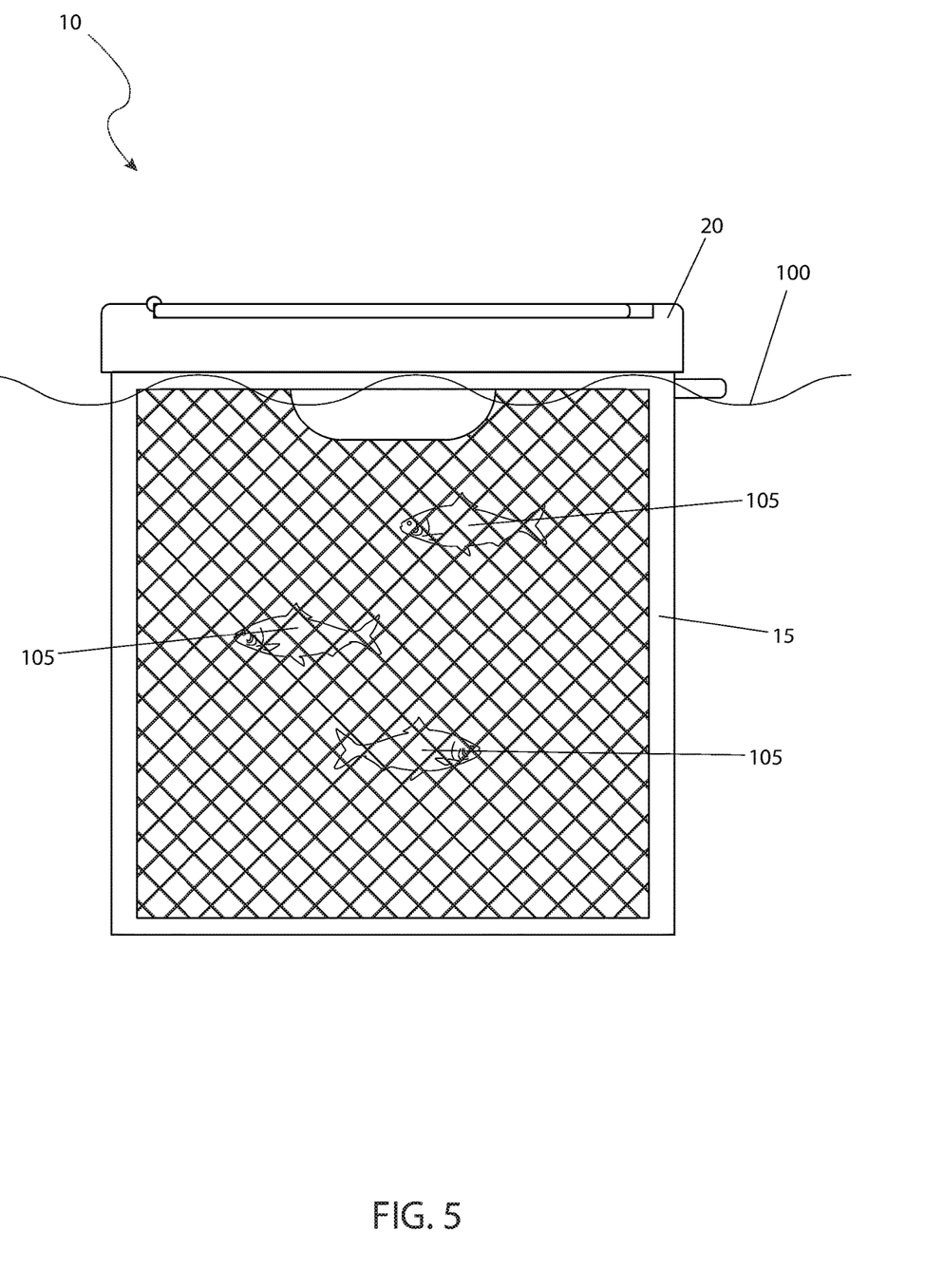

Referring to FIG. 5, a sectional view of the device 10, as seen along a line II-II, as shown in FIG. 4, while being utilized, according to the preferred embodiment of the present invention is depicted. This view is similar to that of FIG. 3, with the added disclosure of the waterline 100 being present. The buoyant nature of the flotation lid 20 ensures that the basket 15 remains under water. As such, any caught fish 105 remain in the same water from which they were just caught. This allows them to remain alive for long periods of time and ensures fresher tasting fish when processed at the end of the fishing event.

2. OPERATION OF THE PREFERRED EMBODIMENT

The preferred embodiment of the present invention can be utilized by the common user in a simple and effortless manner with little or no training. It is envisioned that the device 10 would be constructed in general accordance with FIG. 1 through FIG. 5. The user would procure the device 10 from conventional procurement channels such as sporting good stores, hunting and fishing stores, mail order or internet supply houses or the like. Special attention would be paid to overall dimensions of the device 10 as well as to opening size of the mesh openings 80.

After procurement and prior to utilization, the device 10 would be prepared in the following manner: in the case of fishing from a shoreline, the anchor stake 45 would be anchored in the shoreline 95 by hammering or other well-known manner. The tether 40 would be secured to the tether attachment point 35 of the basket 15 at a first end and to the anchor stake 45 at a second end; in the case of fishing from a dock or boat, the distal end of the tether 40 would be secured to a fixed point, such as a dock post, handrail, or cleat; and the open mesh basket 15. With the solid exterior box 70 removed, the device 10 would be allowed to float within the body of water 90 while the flotation lid 20 remains above the waterline 100.

During utilization of the device 10, the following procedure would be initiated: the user 85 would fish in a normal manner; as fish are caught, the user 85 would pull the tether 40 such that the device 10 is directly adjacent to the user 85; the lid 55 is then opened by manipulation of the lift handle 65 against the hinges 60, and the caught fish 105 placed inside; alternately, a downward force is applied to the trapdoor 51, which opens into the basket 15, the device 10 is then again allowed to float free in the body of water 90. This process is repeated until the fishing expedition is complete or the basket 15 is filled. The caught fish 105 will then place the device 10 within the solid exterior box 70, with or without water inside, and transport the device 10 and the caught fish 105 to another physical location for further processing such as cleaning, filleting, cooking, and the like. It is also envisioned that the caught fish 105 may be released back into the body of water 90 if desired as well.

After use of the device 10, it is emptied, cleaned and/or rinsed, and stored until needed again in a cyclical repeating manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A passive livewell, comprising:
a generally rectangular-shaped open mesh basket having four open mesh sides each with an open mesh bottom, two of the four open mesh sides each having a basket carrying handle to facilitate carrying the passive livewell, the two of the four open mesh sides are shorter than the remaining four open mesh sides;
a flotation lid having a sealed collar which is filled and a center, the center of the flotation lid includes a lid for access to an interior of the generally rectangular-shaped open mesh basket;
a tether attachment point disposed on a face of the generally rectangular-shaped open mesh basket, the tether attachment point is used with a tether, and the tether is used with an anchor stake adapted to tether the passive livewell near a user;
one or more first hinges connecting the sealed collar and the flotation lid;
a lift handle allowing for lifting of the flotation lid;
a trapdoor disposed on a center of the flotation lid, the trapdoor having an upper surface;
a second hinge hingedly attaching the trapdoor to the flotation lid in a flush manner such that the upper surfaces thereof are coextensive, the second hinge includes a torsion spring that biases the trapdoor upwards and closes against the flotation lid;
a solid exterior box slipped over the generally rectangular-shaped open mesh basket for transport of the passive livewell; and
a notch disposed on an upper perimeter edge, the notch to align with the tether attachment point of the generally rectangular-shaped open mesh basket to permit passage thereof;
wherein the upper surface of the trapdoor receives a downward force that presses against the second hinge and provides access to the interior of the generally rectangular-shaped open mesh basket;
wherein the generally rectangular-shaped open mesh basket is floating at a waterline with the open mesh basket submerged in a plurality of water in a body of water;
wherein two solid exterior box carrying handles are disposed on the solid exterior box which align with the two basket carrying handles of the generally rectangular-shaped open mesh basket when the generally rectangular-shaped open mesh basket is placed within the solid exterior box; and wherein the generally rectangular-shaped open mesh basket is made of ultraviolet resistant plastic from an injection molding process or from a blow molding process.

2. The passive livewell according to claim 1, wherein said generally rectangular-shaped open mesh basket is twenty-four inches wide, eighteen inches tall, and sixteen inches deep.

3. The passive livewell according to claim 1, further comprising a plurality of mesh openings disposed on the four open mesh sides and the open mesh bottom.

4. The passive livewell according to claim 1, wherein the generally rectangular-shaped open mesh basket and the flotation lid are formed as a unitary component.

5. The passive livewell according to claim 1, wherein the generally rectangular-shaped open mesh basket and the flotation lid are formed separately and are attached to each other by a mechanical fastening means.

6. The passive livewell according to claim 1, wherein the sealed collar is filled with material selected from the group consisting of air, Styrofoam, or closed cell foam.

7. The passive livewell according to claim 1, wherein the tether is connected to the tether attachment point at a first end and to the anchor stake at an opposing second end.

8. The passive livewell according to claim 1, wherein the tether is made of waterproof material.

9. The passive livewell according to claim 8, wherein the waterproof material is nylon.

10. The passive livewell according to claim 8, wherein the waterproof material is polypropylene.

11. The passive livewell according to claim 1, wherein the tether is twenty-five feet long.

12. The passive livewell according to claim 1, wherein the solid exterior box is left empty to capture the water from the body of water in the open mesh field during subsequent transport and storage.

13. The passive livewell according to claim 1, wherein the passive livewell is adapted to be filled with the water from the body of water, to carry a plurality of caught fish from a catch location to another location.

14. The passive livewell according to claim 13, wherein the caught fish are placed within the generally rectangular-shaped open mesh basket either through the trapdoor or the lid such that they remain alive throughout a fishing outing.

15. The passive livewell according to claim 14, wherein the flotation lid floats to ensure that the generally rectangular-shaped open mesh basket remains under the water in the body of water and any of the caught fish remain in the water in the body of water to allow them to remain alive fora long period of time and ensures a plurality of fresher tasting fish when processed at the end of the fishing outing.

* * * * *